United States Patent [19]

Holoff et al.

[11] Patent Number: 5,087,005
[45] Date of Patent: Feb. 11, 1992

[54] TWIST-CAM SUCTION CUP ASSEMBLY

[76] Inventors: Richard S. Holoff, 3024 Daphney Ct., Simi Valley, Calif. 93063; J. David Riggins, 8544 Noble Ave., Sepulveda, Calif. 91343

[21] Appl. No.: 654,276

[22] Filed: Feb. 12, 1991

[51] Int. Cl.⁵ ............................................... A45D 42/14
[52] U.S. Cl. ................................. 248/205.8; 248/362; 248/363
[58] Field of Search ............... 248/205.8, 205.9, 206.2, 248/206.3, 206.4, 309.3, 363, 362; 269/21; 294/64.1

[56] References Cited

U.S. PATENT DOCUMENTS

| | | |
|---|---|---|
| 577,436 | 2/1897 | Lenz . |
| 2,089,714 | 1/1935 | Schuler . |
| 2,169,183 | 8/1939 | Fish ............... 248/206.4 X |
| 3,675,886 | 7/1972 | Kempmler . |
| 3,747,170 | 7/1973 | Kieves ............. 248/205.8 X |
| 3,765,638 | 10/1973 | Harrison . |
| 3,863,568 | 2/1975 | Frederick ............ 248/362 X |
| 4,012,007 | 3/1977 | Cunningham .......... 248/205.8 X |
| 4,506,855 | 3/1985 | McElhaney .......... 248/362 X |
| 4,708,381 | 11/1987 | Lundback ............ 294/64.1 X |
| 4,934,641 | 6/1990 | McElhaney . |

FOREIGN PATENT DOCUMENTS 159046 9/1954 United Kingdom ............ 248/205.8

Primary Examiner—J. Franklin Foss
Attorney, Agent, or Firm—Poms, Smith, Lande & Rose

[57] ABSTRACT

A suction cup assembly is provided for securing a utilization device to a surface. The suction cup assembly includes a suction cup and a core member. The core member has a generally cylindrical outer surface, and is secured to the suction cup. The assembly also has a cone member which has an outer periphery generally co-extensive with the outer portion of the suction cup, and which has a generally cylindrical inner opening closely enclosing the cylindrical outer surface of the core member. The cone member and the core member constitute a pair of mating members. The assembly further includes a cam member for axially shifting the core member outward relative to the cone member by pulling the center of the suction cup away from a surface to which the suction cup may be adhered. The cam member has generally cylindrical camming surfaces, and is mounted onto and closely engages either the core member or a camming flange on the cone member, depending on the embodiment.

19 Claims, 2 Drawing Sheets

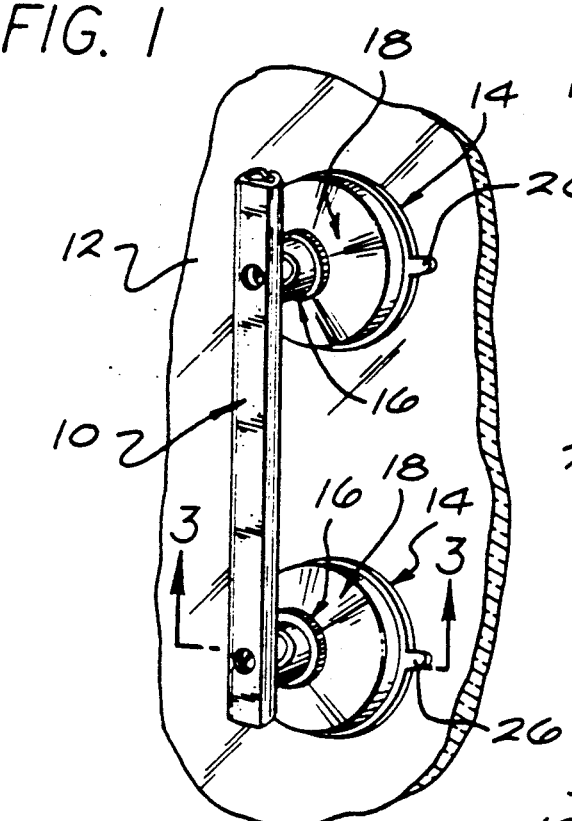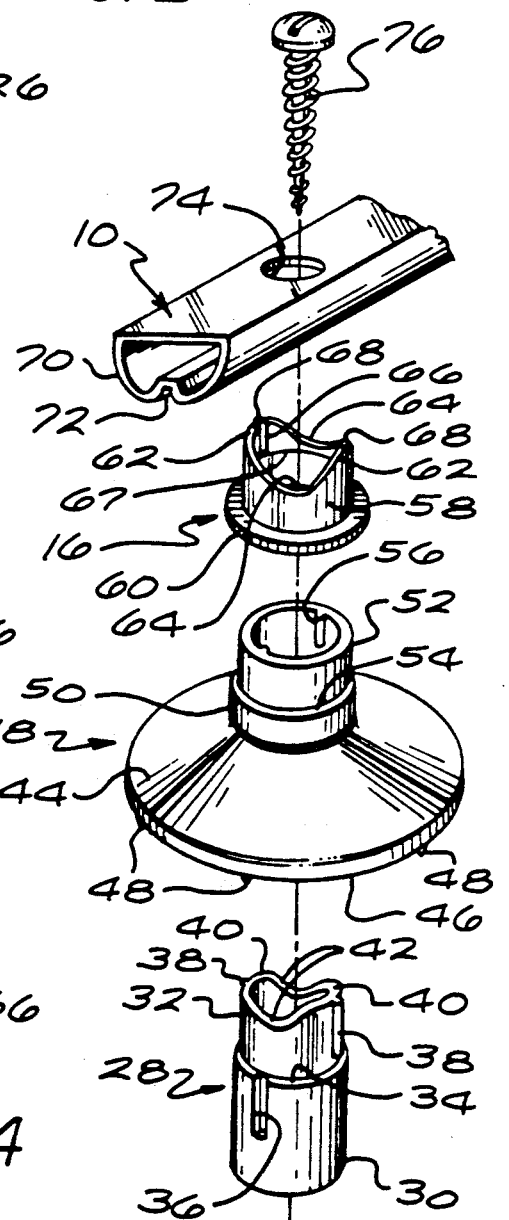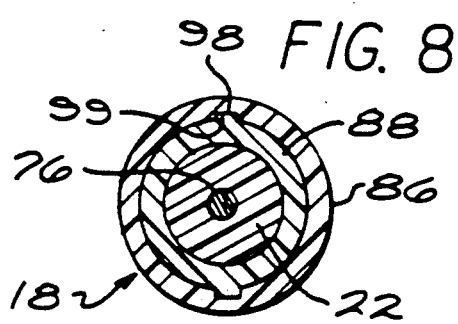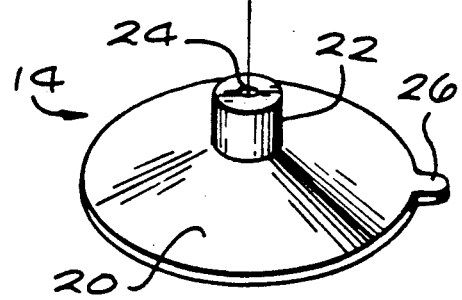

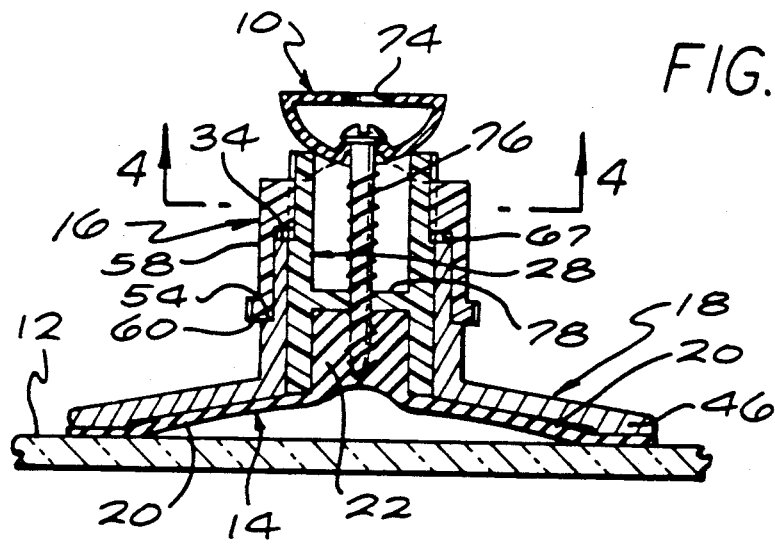
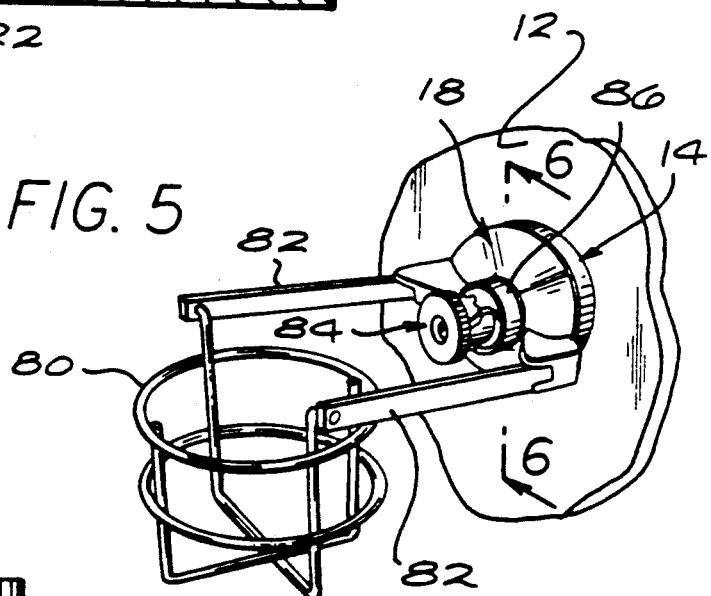
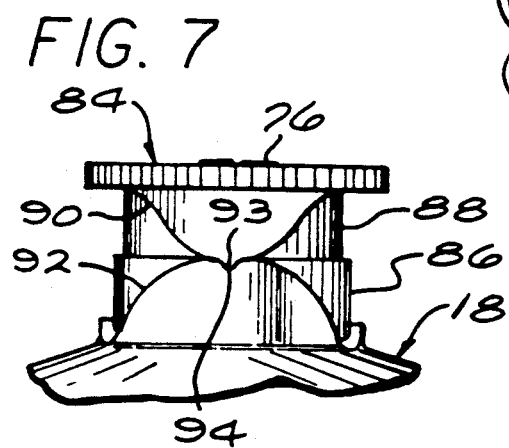
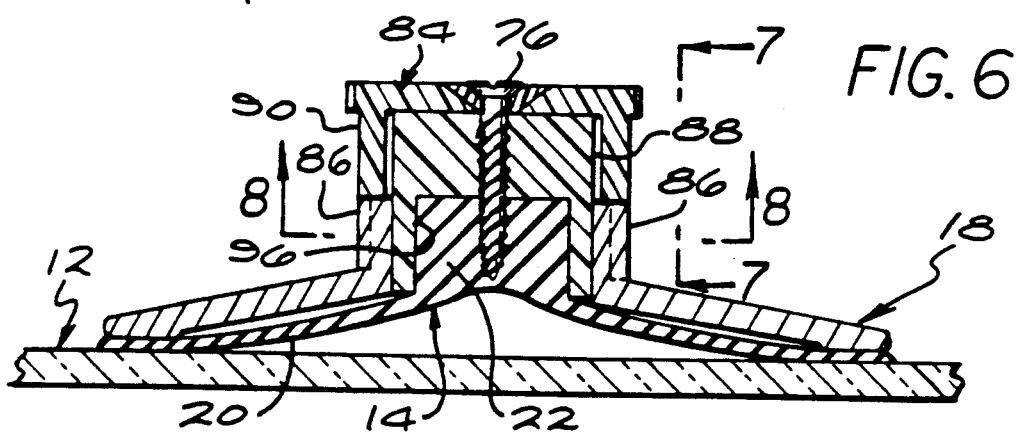

TWIST-CAM SUCTION CUP ASSEMBLY

FIELD OF THE INVENTION

This invention relates to a suction cup assembly including a twisting cam for tensioning a suction cup in order to increase the force of suction.

BACKGROUND OF THE INVENTION

Suction cups have been used on many devices in the office as well as in the home for a long time, and the way in which a suction cup works is well known. In essence, a resilient and air-tight concave body is pressed against a surface. The periphery of the body forms an air-tight seal with the surface, and when the center of the body pulls resiliently away from the surface, a partial vacuum is formed between the body and the surface so that the body "sticks" to the surface. The greater the vacuum the better the cup sticks to the surface.

One factor which limits the degree of vacuum which can be achieved is the vacuum itself—the vacuum resists the resilient force of the body so that the force of suction balances the resilient force of the body of the suction cup. However, if one could "pull" the center of the body away from the surface, thereby at least partially overcoming the restraining effect of the vacuum, the vacuum can be made even greater.

Several devices have been proposed to "pull" the center of the suction cup away from the surface in order to increase the suction. The most common arrangement, often found for example on the bases of pencil sharpeners and many kitchen appliances, involves a rod or crankshaft which extends mainly parallel to the surface to which the suction cup is to adhere. The center of the suction cup is attached to an eccentric section of the rod or crankshaft, and when a lever arm is turned, the center of the suction cup is pulled outward. U.S. Pat. No. 2,089,714 (Schüler, Aug. 10, 1937); U.S. Pat. No. 3,675,638 (Kampmirer, July 11, 1972); U.S. Pat. No. 3,765,638 (Harrison, Oct. 16, 1973); and U.S. Pat. No. 4,934,641 (McElhaney, June 19, 1990) all describe such shaft-based arrangements.

One problem with arrangements using crankshafts and eccentric rods is that they have lever arms which extend out from whatever device they are mounted in, so that it is all too easy to hit or snag on the arm accidentally and thereby to release the suction. Another drawback of lever arms is that the support and bearing structure for them is difficult to integrate into the structure of the device which is utilizing the suction cups. This complication increases costs and the likelihood of failure.

A further cause of increased costs associated with such suction cup assemblies according to the prior art is that they usually require suction cups that must be specially designed to accommodate the lever arms, crankshafts, and the like.

The object of this invention is consequently to provide a suction cup arrangement which includes a tensioning device for pulling the center of a suction cup away from the surface on which it is to adhere. The tensioning device is simple, highly effective and compact, and eliminates the risk of inadvertent release. Its support structure may be manufactured of easily molded plastic parts, and is easily integrated with the support structure of the suction cup itself. The suction cup itself may be of a readily available shape and material, and little or no special modification is required.

SUMMARY OF THE INVENTION

According to the invention, the suction cup assembly is intended to secure a utilization device to a surface. The suction cup assembly according to the invention includes a suction cup and a core member. The core member has a generally cylindrical outer surface, and is secured to the suction cup. The assembly also has a cone member which has an outer periphery generally co-extensive with the outer portion of the suction cup, and which has a generally cylindrical inner opening closely enclosing the cylindrical outer surface of the core member. The cone member and the core member constitute a pair of mating members.

In order to increase the suction of the suction cup, the assembly further includes a cam member for axially shifting the core member outward relative to the cone member by pulling the center of the suction cup away from a surface to which the suction cup may be adhered. The cam member has generally cylindrical camming surfaces, and is mounted onto and closely engages the core member. The cam member is designed so as to have two stable positions, substantially at the two extreme relative axial positions of the cone and core member.

According to another aspect of the invention, the assembly may also include an arrangement for preventing relative rotation of the two mating members while permitting relative axial movement thereof, in order to prevent undesired rotation of the utilization device and the suction cup.

BRIEF DESCRIPTION OF THE DRAWINGS

FIG. 1 is a perspective view of one application of the suction cup assembly according to the invention, in which the suction cup assembly is used to fasten a handle to a glass door;

FIG. 2 is an exploded view of a portion of the first embodiment of the suction cup assembly;

FIG. 3 shows a vertical cross section of the suction cup assembly, taken along line 3—3 in FIG. 1;

FIG. 4 shows a horizontal cross section of the section cup assembly, taken along line 4—4 in FIG. 3;

FIG. 5 illustrates a second embodiment of the suction cup assembly in use in a second application;

FIG. 6 shows a vertical cross section of the second embodiment of the suction cup assembly, taken along line 6—6 in FIG. 5;

FIG. 7 is a side view of a cam member and a core member in the second embodiment of the suction cup assembly; and FIG. 8 shows a horizontal cross section of the second embodiment of the suction cup assembly, taken along line 8—8 in FIG. 6.

DETAILED DESCRIPTION

As will become clear, the suction cup assembly according to the invention may be used in a great variety of applications. In order to illustrate a first embodiment of the assembly, it is assumed by way of example only that it is to be used to secure a handle to a sliding glass door. Although most sliding glass doors in homes come with some form of handle, the handle provided is invariably designed for adults, and is often relatively small and inconvenient even for adults. Children who try to close the door will often grab the edge of the door to pull it shut, and in doing so they often close the door on their fingers. In applications such as this, the invention provides a secure and relatively inexpensive second handle which can be positioned at any desired height on the door, and which is easily accessible for all users. As a collateral advantage, glass doors will remain cleaner and normally free of hand prints.

FIG. 1 illustrates this application, in which the handle 10 is to be attached to the glass door 12 using suction cups 14. According to the invention, each suction cup 14 is tensioned using a twist-cam member 16, which is mounted between the handle 10 and a rigid cone member 18.

FIG. 2 is an exploded view of the first embodiment of the assembly. Solely for the sake of clarity, "up," "down," "above," and "below" relate to the orientation of the assembly shown in FIG. 2. As FIG. 2 shows, the suction cup 14 has a substantially circular, concave base 20 and a centrally located, mainly cylindrical attachment portion 22. The suction cup 14 is made of any conventional material, such as rubber, which is resilient, flexible, and provides an air-tight seal at its periphery with the underlying surface. Flexible and resilient plastic having similar properties may also be used. One advantage of the invention is that the suction cup used in the invention is the same as or very similar to many suction cups that are already readily available on the market. The material used to make the suction cup may be UV-resistant or coated with a UV-resistant material to delay degradation of the rubber by the sun. If the surface is smooth and properly cleaned, the handle, once attached according to the invention, is able in most cases to remain attached to the surface for many months or even years.

A vertical hole 24 is made in the attachment portion 22, approximately along its centerline, which, as the dash-dotted vertical line in FIG. 2 illustrates, is also the centerline of the suction cup assembly as a whole. The centerline also defines an axial direction, which is referred to below in reference to the relative movement of parts during tightening of the assembly.

A tab 26 preferably extends from the periphery of the base 20 of the suction cup. When the suction cup is stuck to a surface, the user can easily remove the suction cup by lifting the tab 26 to release the vacuum under the base 20.

The suction cup assembly also includes a generally cylindrical core member 28, which anchors and guides the various parts of the suction cup assembly. The core member has a cylindrical lower portion 30 and a cylindrical upper portion 32. The outer radius of the upper portion 32 is slightly less than the outer radius of the lower portion 30, so that a narrow circumferential shoulder 34 is defined at their intersection. The inner radius of the lower portion 30 is approximately equal to the outer radius of the attachment portion 22 of the suction cup 14. At least one mainly vertical keyway slot 36, the purpose of which is described below, may be provided in the lower portion 30. The upper portion 30 is preferably provided with at least one vertical rib 38; in FIG. 2, two diametrically opposed ribs 38 are shown.

The upper edge of the upper portion 32 of the core 28 is contoured, with diametrically opposing raised portions 40 and, ninety degrees away from the raised portions 40, diametrically opposing, rounded, lowered portions 42. The ribs 38 are approximately in line with the highest points of the raised portions 40. The lowered portions 42 approximate the mainly cylindrical, lower surface of the handle shaft 10. The core may be manufactured easily as a unit of molded plastic or any other durable material which is able to withstand repeated frictional forces without rapid deterioration.

The cone member 18 includes a mainly conical base 44, preferably with a downward extending lip 46 running around its periphery. In order to resist rotation, the base 44 preferably, although optionally, also includes a number of gripping feet or teeth 48. Alternatively, the bottom edge of the lip 46 may be knurled or provided with some non-skid material. Extending upward from the base 44, the cone member 18 has a cylindrical lower portion 50 and a cylindrical upper portion 52.

In one prototype of the invention, the outer radius of the upper portion 52 was slightly less than the outer radius of the lower portion 50, so that a narrow circumferential shoulder 54 was defined at their intersection. The shoulder 54 limits the downward travel of the cam member and thus determines a minimum distance of the handle from the underlying surface 12, but the shoulder 54 is optional. The inner radius of the upper portion 52 is equal to or just slightly greater than the outer radius of the lower portion 30 of the core member 28. Inward extending ribs 56 are provided on the inner surface of the upper portion 52. In FIG. 2, two diametrically opposed ribs 56 are shown.

The twist-cam member 16 has a mainly cylindrical wall-like body 58, preferably with a horizontally and outwardly extending flange 60 along the bottom edge of the body 58. The flange is preferably knurled to make it easier for a user to grasp and twist the cam member. The upper camming edge of the cam member 16 is contoured, generally cylindrically, with diametrically opposing raised portions 62 and, ninety degrees away from the raised portions 62, diametrically opposing, rounded, lowered portions 64. It is not necessary according to the invention for the upper edge of the core member 28 to be contoured as well, although in many applications the contoured shape may add some stability and support for the handle. Rather, the upper edge of the upper portion 32 of the core member 28 may be even, that is, lying in a plane, as long as the upper edge does not then extend higher than the lowered portions of the camming edge of the cam member and prevent the undersurface 70 of the handle from resting in the "saddle" created by the contouring of the camming edge.

The portion of the wall or body 58 of the cam member extending upward from slightly below the lowest point of the upper edge is preferably thickened, thereby creating an inner circumferential shoulder 67. Vertical grooves 66 are made in the body 58 of the cam member 16, approximately in line with the highest points of the raised portions 62. A locking tab 68 extends upward from the highest point of each of the raised portions 62. The lowered portions 64 approximate a mainly cylindrical, horizontal cut-away of the upper edge of the wall-like body 58. Like the core 28, the cam member 16 may be manufactured easily and inexpensively as a unit of molded plastic.

The suction cup assembly according to the invention is intended to secure some device—a "utilization device"—to a surface. In the example illustrated in FIG. 2, the utilization device is a door handle. The handle 10, or the part of the utilization device which is to cooperate with the suction cup assembly, has a bottom wall or surface 70 which is roughly semi-cylindrical in cross section so that it conforms generally to the cutaway upper edge of the cam member 16. A longitudinal groove 72 runs along the bottom of the wall or surface 70. The handle (or corresponding part) may be either solid or hollow. A hole 74 is made through the handle 10, through which a screw 76 may be inserted to hold together the suction cup assembly.

To assemble the suction cup assembly according to the invention (the order of assembly is optional), one initially inserts the suction cup 14 into the core member 28, and then inserts the core member 28 into the cone member 18 so that the ribs 56 enter the keyway slots 36 of the core 28; the core and cone members may thereby be prevented from rotating relative to one another. When mounted, the shoulder 34 of the core is roughly even with the upper edge of the upper portion 52 of the cone member 18, but the core is able to move axially relative to the cone member, with the degree of relative axial movement upward being limited only by the height of the keyway slots 36.

One then mounts the cam member 16 onto the upper portion 32 of the core member 28, and the upper portion of the core member 18, whereby the flange 60 bears against the shoulder 54 of the cone member 18. In mounting the cam member 16 on the core 28, one orients the cam member 16 so that the ribs 38 of the core slide into the grooves 66 of the cam member. The attachment portion 22 of the suction cup 14 is then inserted into the lower portion 28 of the core. To complete the assembly, the handle 10 is laid onto the cam member 16 and the screw 76 is passed through the hole 74 in the handle and along the centerline of the cam member, cone member and core, engaging horizontal surface or web 78 of the core, and is screwed into the attachment portion 22 of the suction cup 14.

FIG. 3 shows a vertical cross section of the first embodiment of the suction cup assembly according to the invention. FIG. 3 also shows that the core member 28 is generally H-shaped in cross section, with a horizontal wall 78 within the lower portion 30. The screw 76 is screwed through this wall 78 when assembling the invention. When mounted, the attachment portion 22 of the suction cup 14 is entrapped in the chamber defined in the lower portion of the core beneath the wall 78. When the screw is screwed into the attachment portion 22 of the suction cup, the attachment portion expands against the wall of the core in the chamber to provide a tight and secure hold much stronger than the hold provided by the threading of the screw alone.

Referring to both FIG. 2 and FIG. 3, assume that the curved bottom wall or surface 70 of the handle bar is resting on the cam member 16 so that the lowest point of the undersurface contacts the lowered portions 64 of the upper edge of the cam member. In this configuration, the flange 60 is as close as is possible to the undersurface 70 of the handle 10. In this released position, the screw 76 is in the attachment portion 22 of the suction cup 14, but with little tension in the axial direction. The released position is thus a stable position for the cam member.

Furthermore, the ribs 38 of the core are in the grooves 66 of the cam member 16. The rib 38/groove 66 combination thus indicates to the user that the cam member is twisted to the released position; this indicative function enables the user to be sure to get the greatest strength from the assembly by not starting at an "intermediate" cam position, but the ribs 38 and grooves 66 may be omitted if this feature is not desired. When the cam member is twisted out of the released position, the ribs 38 will snap out of the grooves 66, with a slight clearance between the cam member and the core. If the ribs and grooves are omitted, however, no clearance is required.

Assume now that the suction cup has been pressed against the surface 12, so that a partial vacuum is formed as the suction cup resiliently tries to regain its unstressed shape. When the assembly is in the released position and the cam member 16 is twisted, the undersurface 70 of the handle 10 will be forced upward, lifting the core member 28, as the handle rides up on the camming edge of the body 58 of the cam member. The head of screw 76 will then also be pushed axially away from the cone member 18, and the screw 76 will pull upward the attachment portion 22 of the suction cup 14, also pulling with it the core member 28. The core member will slide axially upward relative to the cone member, with the ribs 56 and the keyway slots 36 (if included) guiding the motion.

When the cam member 16 is twisted ninety degrees, the assembly is in the tightened position, with the undersurface 70 of the handle in contact with the highest points of the raised portions 62 of the upper edge of the cam member. The undersurface 70 thus forms a bearing surface for the cam member, and the undersurface may be either a portion of the utilization device itself (as in the case of the handle shown in FIGS. 1 and 2), or it may be a specially provided bearing part of the utilization device. The locking tabs 68 then snap into the groove 72 to prevent the cam member from rotating back on its own to the released position; the locking tabs thus ensure that the tightened position is also a stable position for the assembly.

Of course, when the center of the suction cup 14 is pulled upward, away from the surface 12, the vacuum between the suction cup and the surface is increased. A simple ninety-degree twisting of the cam member 16 according to the invention thus increases the holding power of the suction cup 14.

Any or all of the anti-rotating features of the first embodiment, such as the rib 56/ slot 36 combination and the gripping teeth 48, may optionally be deleted on applications such as handles which, since they involve two points of attachment, will not rotate anyway. However, anti-rotating features are preferred for many single-suction cup applications: if the core and/or cone (and thus the utilization device itself) are able to rotate relative to one another or to the suction cup, not only does the assembly appear less "solid" to the user, but, more importantly, the screw may become unscrewed from the suction cup and the assembly may come apart accidentally.

In the first embodiment of the invention, the twistcam member 16 is able to bear or "brace" upward against the undersurface of the handle and downward against the cone member 18. In other words, the upward-directed force of the handle 10 applied by the cam member 16 serves to pull the core member 28 upward and increase the vacuum within the suction cup 14. In other applications, however, there may be no undersurface against which to brace. FIGS. 5–8 illustrate a second embodiment of the suction cup assembly according to the invention which is adapted for such applications.

By way of example only, the description of the second embodiment of the invention assumes that the device to be held by the suction cup assembly is a cup holder 80 gimballed in a pair of arms 82, which are rigidly attached to the cone member 18. The actual application may of course vary; the characteristic of interest as far as the second embodiment is concerned is that there is no convenient surface of the utilization device against which a cam member can brace. The second embodiment is also advantageous in that it is particularly compact.

In the second embodiment, a cam member 84 cooperates with a camming flange 92 on the cone member 18 itself. FIG. 6 shows a vertical cross section of the second embodiment. Parts which are substantially the same as in the first embodiment are given the same reference numbers. In addition to the cone member and the cam member, the second embodiment has a core member 88, which is shaped mainly as a cylinder with a cylindrical cavity in its lower half. As in the first embodiment, the attachment portion 22 of the suction cup 14 is entrapped in the cylindrical cavity and when the screw 76 is screwed into the attachment portion, the attachment portion expands and presses hard against the inner wall 96 of the cavity to secure the suction cup to the core member. As FIG. 6 shows, the cam member 84 fits over and encloses the upper half (approximately—the particular dimensions may be chosen to suit a given application) of the core member 88.

FIG. 7 illustrates the camming arrangement in the second embodiment. The cam member 84 has two diametrically opposed, rounded (generally cylindrically) camming portions 90 which extend downward from the discshaped, knurled upper portion. The camming flange 86 of the cone member 18 is provided with a contoured relief 92, with two diametrically opposed raised portions and two diametrically opposed lowered portions ninety degrees apart from the raised portions. An indentation 93 is made in the top of each raised portion. At the point of greatest downward extension, each camming portion 90 of the cam member 84 has a small tab or protrusion which mates with a corresponding one of the indentations 94 in order to form a snap-lock arrangement to hold the cam member 84 in a tightened position.

FIG. 8 shows a horizontal cross section of the second embodiment taken along line 8—8 in FIG. 6, in which the camming flange 86, the core 88 and the attachment portion 22 are seen. FIG. 8 also shows that the core 88 is provided with opposing vertical ribs 98, and the camming flange 86 is provided with mating vertical slots 99 so that the core 88 is keyed into the camming flange 86. This keying arrangement thus allows the core to move axially relative to the cone member, but prevents the core from rotating relative to the cone member.

To assemble the second embodiment, the attachment portion 22 is inserted into the chamber 96 of the core 88. The core is inserted up into the flange 86 of the cone member 18. The cam member 84 is then placed over the core 88 so that the tabs on the rounded camming portions 90 are at or near the lowest portion of the contoured relief 92 of the cone 18. (This configuration is the released position of the second embodiment.) The screw 76 is screwed through a preferably countersunk hole in the center of the top of the cam member, through the upper portion of the core 88, and into the attachment portion 22 of the suction cup 14.

To attach the cup holder or other utilization device to the surface 12, one makes sure that the cam member 84 is twisted to the released position and presses the suction cup as usual against the surface. The user then turns the cam member 84, whereby the camming portions 90 of the cam member will begin to ride up on the corresponding portions of the contoured relief 92 on the cone 18. As the camming portions ride up on the relief, the cam member is forced upward, pulling with it the core and attachment portion and thereby increasing the vacuum between the suction cup and the surface. When the tabs on the camming portions snap into the corresponding indentations 94 on the relief, the assembly is in a tightened position, in which the attachment portion 22 is pulled as far away from the surface as possible; the maximum upward pull to be produced may be adjusted by changing the height of the camming portions 90.

To release the cup holder, one simply turns the cam member so that the tabs on the camming portions of the cam member snap out of the indentations 94 and one continues to turn the cam member until it, under the resilient force of the suction cup, turns to the released position. By lifting the tab 26 on the base of the suction cup (see FIG. 2), all the vacuum under the suction cup will be released.

In the second embodiment, the cam member 84 bears upward against the head of the screw 76 and downward against the contoured relief 92 on the cone 18. One may note that, in the first embodiment (see FIGS. 2 and 3), the cam member also braces upward against the head of the screw, although it does so via the handle 10. In the second embodiment, the cam member is turned so that the contoured camming surface points downward, whereby the upper surface of the camming member bears directly upward against the screw head.

As is pointed out above, not all applications of the invention require anti-rotation features such as the rib 56/slot 36 combination in the first embodiment. Moreover, it is possible to provide the ribs on the core, with mating slots in the cone member—the keying feature would be the same. Other variations are also possible and fall within the scope of the claims.

For example, the core member 28 in the first embodiment serves to align and secure the assembly, and also provides a lower bearing surface for the cam member. Furthermore, the ability of the assembly to pull the suction cup upward is greatly increased by having the attachment portion expand under the influence of the screw against the inner wall of the lower portion of the core.

It would, however, be possible to omit the core if the screw were attached securely to the attachment portion of the suction cup in some other manner. For example, a metal band or ring could be securely and firmly attached around the attachment portion, so that the attachment portion would expand against and be held by the band or ring as the screw is screwed in. The cam member could then be allowed to bear downward against the shoulder 54 of the cone member 18 and upward againstd undersurface 70 of the handle 10.

It is to be understood that the foregoing detailed description and accompanying drawings illustrate preferred embodiments of the invention. Various additional modifications and changes may be made without departing from the spirit and scope of the invention. Thus, by way of example and not of limitation, threaded mating parts could be employed with the threads implementing the camming surface feature; for example, in FIG. 6 the cam member 84 could be threaded to the cylindrical portion of the cone 86, and in the embodiment of FIGS. 1-4 the member 16 could be in the nature of a nut which would engage either the cone or core to provide lifting of the core, depending on the desired mechanical configuration. It is also noted that the suction cup assembly of the present invention could be employed to support rear view mirrors, towel racks, soap dish holders, utility shelves, or any other device which may require firm mounting on smooth surfaces.

What is claimed is:

1. A twist cam suction cup assembly comprising:
   a suction cup which has a central attachment portion;
   a core member secured to said suction cup, said core member having a generally cylindrical outer surface and an upper cylindrical portion and a lower cylindrical portion delimiting a lower chamber;
   a cone member having an outer periphery generally co-extensive with the outer portion of said suction cup, said cone member having a generally cylindrical inner opening closely enclosing the cylindrical outer surface of said core member;
   said cone member and said core member constituting a pair of mating members;
   a utilization device having a bearing surface and being mounted on one of said two mating members;
   a cam member having generally cylindrical camming surfaces, said camming surfaces comprising a generally cylindrically contoured camming edge for bearing against the bearing surface of the utilization device;
   said cam member being mounted onto and closely engaging the upper cylindrical portion of the core member;
   anti-rotation means, comprising a mating combination of ribs and keyway slots on the cone member and core member, respectively, for preventing relative rotation of said two mating members while permitting relative axial movement thereof, to prevent undesired rotation of said utilization device and said suction cup;
   securing means for connecting the suction cup to the utilization device;
   said core member having an internal wall perpendicular to the outer surface, said internal wall delimiting the lower chamber and said lower chamber being provided for entrapping the attachment portion of the suction cup when the securing means is inserted into the attachment portion;
   said cam member and its associated camming surfaces serving to axially shift the core member outward with respect to said cone member to increase the suction of the suction cup by pulling the center thereof away from a surface to which the suction cup may be adhered, to shift the assembly to a tightened position as the cam member is rotated; and
   snap-lock means, comprising a groove on the utilization device and mating tabs on the camming surfaces of the cam member, for releasably locking the cam member into the tightened position.

2. A twist cam suction cup assembly comprising:
   a suction cup;
   a core member secured to said suction cup, said core member having a generally cylindrical outer surface;
   a cone member having an outer periphery generally coextensive with the outer portion of said suction cup, said cone member having a generally cylindrical inner opening closely enclosing the cylindrical outer surface of said core member;
   said cone member and said core member constituting a pair of mating members;
   a utilization device mounted on one of said two mating members;
   a cam member having generally cylindrical camming surfaces;
   said cam member and its associated camming surfaces serving to axially shift the core member outward with respect to said cone member to increase the suction of the suction cup by pulling the center thereof away from a surface to which the suction cup may be adhered, to shift the assembly to a tightened position as the cam member is rotated; and
   said assembly further comprising snap-lock means for releasably locking the cam member into the tightened position.

3. A suction cup assembly as defined in claim 2, further including anti-rotation means for preventing relative rotation of said two mating members while permitting relative axial movement thereof, to prevent undesired rotation of said utilization device and said suction cup.

4. A suction cup assembly as defined in claim 3, in which the anti-rotation means comprises a mating combination of ribs and keyway slots on the cone member and core member, respectively.

5. A suction cup assembly as defined in claim 2, in which the cam member is mounted onto and closely engages an upper cylindrical portion of the cone member.

6. A suction cup assembly as defined in claim 2, further including securing means for connecting the suction cup to the utilization device, and in which:
   the suction cup has a central attachment portion;
   the core member has a lower chamber for entrapping the attachment portion of the suction cup when the securing means is inserted into the attachment portion.

7. A suction cup assembly as defined in claim 6, in which the securing means is a screw.

8. A suction cup assembly as defined in claim 6, in which the core member has an internal wall perpendicular to the outer surface, said internal wall delimiting the lower chamber of the core member.

9. A suction cup assembly as defined in claim 2, further including alignment means for aligning and stabilizing the cam member in a stable released position.

10. A suction cup assembly as defined in claim 9, in which the alignment means comprises a mating combination of ribs and grooves on the core member and the cam member, respectively.

11. A suction cup assembly as defined in claim 2, in which the snap-lock means comprises a groove on the utilization device and mating tabs on the camming surfaces of the cam member.

12. A suction cup assembly as defined in claim 2, in which the cone member has a camming flange provided with relief camming surfaces;
   the cam member is mounted over the core member, whereby the cam member and the cone member enclose the core member; and
   the camming surfaces of the cam member comprise rounded, tab-like camming portions which engage the relief camming surfaces of the cone member.

13. A suction cup assembly as defined in claim 12, further including securing means for connecting the suction cup to the utilization device, and in which:
   the suction cup has a central attachment portion; and
   the core member has a lower chamber for entrapping the attachment portion of the suction cup when the securing means is inserted into the attachment portion.

14. A suction cup assembly as defined in claim 12, further comprising snap-lock means for releasably locking the cam member into the tightened position, said snaplock means comprising indentations and mating tabs on the camming surfaces of the cam member and the cone member.

15. A suction cup assembly as defined in claim 12, further including anti-rotation means comprising a mating combination of ribs and keyway slots on the cone member and core member, respectively, for preventing relative rotation of the core member and cone member while permitting relative axial movement thereof.

16. A suction cup assembly as defined in claim 13, further including securing means for connecting the suction cup to the cam member.

17. A suction cup assembly as defined in claim 16, in which the securing means is a screw which passes through an upper surface of the cam member, through the core member and into the attachment portion of the suction cup.

18. A twist cam suction cup assembly comprising:
a suction cup;
a core member secured to said suction cup, said core member having a generally cylindrical outer surface;
a cone member having an outer periphery generally coextensive with the outer portion of said suction cup, said cone member having a generally cylindrical inner opening closely enclosing the cylindrical outer surface of said core member;
said cone member and said core member constituting a pair of mating members;
a utilization device mounted on one of said two mating members;
a cam member having generally cylindrical camming surfaces;
said cam member and its associated camming surfaces serving to axially shift the core member outward with respect to said cone member to increase the suction of the suction cup by pulling the center thereof away from a surface to which the suction cup may be adhered, to shift the assembly to a tightened position as the cam member is rotated;
said utilization device having a longitudinally extending curved cross-sectional configuration, the camming surfaces of said camming member including a generally cylindrical camming edge; and means for providing camming action between said cylindrical camming edge and said longitudinally extending curved cross-sectional configuration of said utilization device.

19. A twist cam suction cup assembly comprising:
a suction cup;
a core member secured to said suction cup, said core member having a generally cylindrical outer surface;
a cone member having an outer periphery generally coextensive with the other portion of said suction cup, said cone member having a generally cylindrical inner opening closely enclosing the cylindrical outer surface of said core member;
said cone member and said core member constituting a pair of mating members;
a utilization device mounted on one of said two mating members;
a cam member having generally cylindrical camming surfaces;
said cam member and its associated camming surfaces serving to axially shift the core member outward with respect to said cone member to increase the suction of the suction cup by pulling the center thereof away from a surface to which the suction cup may be adhered, to shift the assembly to a tightened position as the cam member is rotated;
said suction cup having first and second sides, with the first side being a slightly concave side for engaging a surface to which the assembly is to be secured, and an integral portion extending outwardly from the second side of said suction cup; and
said core member having an opening therein encompassing and being secured to said outwardly extending integral portion of said suction cup.

* * * * *